(12) United States Patent
Stannov (10) Patent No.: US 10,704,561 B2
(45) Date of Patent: Jul. 7, 2020

(54) COOLING SYSTEM AND AN AXIAL FAN FOR A COOLING SYSTEM

(71) Applicant: MULTI-WING INTERNATIONAL A/S, Vedbaek (DK)

(72) Inventor: Antoni Hendrik Stannov, Niva (DK)

(73) Assignee: MULTI-WING INTERNATIONAL A/S, Vedbaek (DK)

( * ) Notice: Subject to any disclaimer, the term of this patent is extended or adjusted under 35 U.S.C. 154(b) by 89 days.

(21) Appl. No.: 15/737,123

(22) PCT Filed: Jun. 17, 2016

(86) PCT No.: PCT/EP2016/063995
§ 371 (c)(1),
(2) Date: Dec. 15, 2017

(87) PCT Pub. No.: WO2016/202974
PCT Pub. Date: Dec. 22, 2016

(65) Prior Publication Data
US 2018/0172016 A1    Jun. 21, 2018

(30) Foreign Application Priority Data
Jun. 17, 2015   (EP) ..................................... 15172523

(51) Int. Cl.
F04D 29/16      (2006.01)
F04D 29/38      (2006.01)
F16J 15/3288    (2016.01)

(52) U.S. Cl.
CPC ......... F04D 29/164 (2013.01); F04D 29/388 (2013.01); F16J 15/3288 (2013.01); F05D 2240/56 (2013.01)

(58) Field of Classification Search
CPC ...................................................... F04D 29/164
(Continued)

(56) References Cited

U.S. PATENT DOCUMENTS 3,760,779 A  *  9/1973  MacLennan .............. F01P 5/06
                                                    123/41.05
4,398,508 A      8/1983  Moon et al.
(Continued)

FOREIGN PATENT DOCUMENTS

DE    198 03 502 A1    8/1999
EP    1 081 388 A1    3/2001
(Continued)

*Primary Examiner* — Richard A Edgar
(74) *Attorney, Agent, or Firm* — Muncy, Geissler, Olds & Lowe, PC (57) ABSTRACT

The present invention provides a cooling system. The system comprises a circumferential edge forming an aperture and an axial fan arranged at least partly within the aperture. The axial fan comprises a hub being adapted for rotation about an axis and carrying a plurality of blades. Each blade extends in a radial direction between a root end and a tip end, where the root end is joined with the hub. The system further comprises brushes extending from the tip end towards the circumferential edge, where the brushes at a first end are attached to at least one of the blades at a point of attachment at a distance from the tip end. The brushes overlap the blade from the attachment point to the tip end along the length of the brushes at a pressure side or suction side of the blade.

19 Claims, 6 Drawing Sheets

(58) Field of Classification Search
USPC .......................................... 415/173.3, 174.2
See application file for complete search history.

(56) References Cited

U.S. PATENT DOCUMENTS

| | | | | |
|---|---|---|---|---|
| 5,752,802 | A * | 5/1998 | Jones | F01D 5/20 |
| | | | | 415/170.1 |
| 6,206,642 | B1 * | 3/2001 | Matheny | F01D 5/147 |
| | | | | 415/173.3 |
| 6,290,456 | B1 * | 9/2001 | Fichter | F04D 29/162 |
| | | | | 415/119 |
| 8,262,348 | B2 * | 9/2012 | Diakunchak | F01D 5/20 |
| | | | | 415/173.3 |
| 8,845,283 | B2 * | 9/2014 | Cairo | F04D 29/023 |
| | | | | 415/173.3 |
| 2007/0231128 | A1 * | 10/2007 | Callas | F04D 29/164 |
| | | | | 415/173.3 |

FOREIGN PATENT DOCUMENTS

| | | |
|---|---|---|
| JP | S57 157796 U | 10/1982 |
| JP | 2003/161296 A | 6/2003 |
| WO | WO 2014/079864 A1 | 5/2014 |
| WO | WO-2014079864 A1 * | 5/2014 |

* cited by examiner

COOLING SYSTEM AND AN AXIAL FAN FOR A COOLING SYSTEM

FIELD OF THE INVENTION

The present invention relates to a cooling system. The cooling system comprises a circumferential edge forming an aperture and an axial fan. The axial fan comprises a hub being adapted for rotation about an axis and carrying a plurality of blades extending in a radial direction between a root end and a tip end, where the root end is joined with the hub.

BACKGROUND OF THE INVENTION

Traditionally, an axial fan and a circumferential edge are mounted at each their chassis whereby they can move independently of each other. To ensure that the blades are not damaged during rotation of the hub, the blades and the circumferential edge is traditionally mounted with a clearance between the tip end and the circumferential edge. The clearance is necessary due to vibrations and tolerances. However, this clearance distance increases aerodynamic losses and reduces performance.

DESCRIPTION OF THE INVENTION

It is an object of embodiments of the invention to provide an improved cooling system.

It is a further object of embodiments of the invention to provide a cooling system which reduces aerodynamic losses.

According to a first aspect, the invention provides a cooling system comprising a circumferential edge forming an aperture and an axial fan arranged at least partly within the aperture, the axial fan comprising a hub being adapted for rotation about an axis and carrying a plurality of blades, each blade extending in a radial direction between a root end and a tip end, the root end being joined with the hub, the system further comprising brushes extending from the tip end towards the circumferential edge, wherein the brushes at a first end are attached to at least one of the blades at a point of attachment at a distance from the tip end, and wherein the brushes overlap the blade from the attachment point to the tip end along the length of the brushes at a pressure side or suction side of the blade.

In the context of the present invention, the term 'axial fan' should be understood as, a fan which is adapted to move gas, typically air, in a direction parallel with the rotation axis of the fan. The direction of the air flow may comprise a radial component, so that axial fans also comprises so called mixed flow fans, i.e. a fan having an air flow with an axial and a radial component. Herein 'air' should be understood as covering any gas, so that 'air flow' in the context of the present invention covers a flow of gas.

The axial fan according to the present invention may be used for cooling of an engine. The engine may e.g. form part of a tractor, or a combine harvester or any similar kind of agricultural machinery, or an excavator, a bulldozer, a crane, or any similar kind of construction equipment for on-highway or off-highway usage. Additionally, the axial fan may be used for ventilation, e.g. in relation to maritime, windmill, livestock, and building ventilation.

The hub will typically be connected to an axle which is rotated by the engine via a belt or driven by an electrical driven motor or a hydraulic driven motor. The rotation causes rotation of the hub and thereby movement of air. In air cooled engines, the air cools an outer surface of the engine, and in water cooled engines, the air is blown through a radiator which cools the cooling liquid. This axle may be an axle which forms an extension of the axle of the engine.

The blades may be formed in one part with the hub, or each blade may be formed as separate components which are attached to a hub. Thus, it should be understood, that the term "the root end being joined with the hub" covers both embodiments. In the latter case, the blades may be detachably attached to the hub.

In one embodiment, the hub and the blades are designed such that the pitch of the blade may be set in connection with the attachment of the blade to the hub. In this embodiment, the pitch of the blades may be changed by disconnecting the blades from the hub or by loosening the joint between the hub and the blades, and subsequently attaching or fastening the blades to the hub at a new pitch angle.

The hub and/or the blades may as an example be made from a metal material, plastic material, or from a composite material comprising fibres e.g. of glass or carbon. Different examples are iron, aluminium, polycarbonate, polystyrene, polytetrafluoroethylene, polyamid, polypropolene, or vinyl etc. It will be appreciated that other metals or plastic materials may be used.

The fan comprises a plurality of blades such as three, four, five, six, seven, eight, nine, ten, eleven, twelve, thirteen, fourteen etc. The blades will typically be equidistantly spaced circumferentially along an outer surface of the hub. The blades may, however, also be arranged asymmetrically along an outer surface of the hub. The length of the blades may be in the range 50-1200 millimetres, such as 100 millimetres, such as 250 millimetres, such as 500 millimetres, such as 750 millimetres, such as 1000 millimetres, such as 1200 millimetres. The size of the fan along the axial direction may be in the range of 30-400 millimetres.

The length of the blade should be understood as the distance from the tip end to the position where the blade is attached to the hub. In embodiments where the blades and the hub are formed in one part, the length of the blade should be understood as the distance from the tip end to the outer surface of the hub.

Each blade may define an attachment part and an air moving part. In embodiments, where the blades are detachably attached to the hub, the attachment part is that part of the blade which is attached to the hub. In embodiments where the blades and the hub form an integral element, the attachment part shall be construed as the transition between the blade and the hub.

During operation of the cooling system, the axial fan and the circumferential edge may move and/or vibrate independently of each other as they may be mounted at each their chassis. During operation of the fan, air is moved through the aperture of the circumferential edge. The circumferential edge may e.g. be an orifice plate, such as a metal plate, such as a steel plate, in which the aperture is e.g. cut or stamped. However, it should be understood that the circumferential edge may also be a duct, such as a bell-mouth or may be another element having an opening in which the axial fan may be at least partly arranged, and through which the fan may move air or another gas.

Since the axial fan is located at least partly in the aperture, the circumferential edge is typically directly adjacent the tip end.

In the following, the term "depth" is used to describe the dimension of the circumferential edge and the tip edge in the axial direction. In embodiments where the circumferential edge is constituted by an orifice plate, the depth of the aperture is typically much smaller than the depth of the tip edge. In this embodiment, the circumferential edge may e.g. have a depth of 5-30 percent of the depth of the tip edge, such as 10-20 percent of the depth of the tip edge.

In the context of the present invention, the term leading edge shall be understood as the foremost part of the blade in a stream-wise sense. Similarly, the term trailing edge designates the rearmost part of the blade in a stream-wise sense. The tip edge of the blades extends from the leading edge to the trailing edge at the tip end of the blade.

The cooling system further comprises brushes extending from the tip end towards the circumferential edge, whereby the brushes may reduce leakage between the tip end of the blade and the circumferential edge or even seal a gap forming a clearance area between the tip end and the circumferential edge. As an example, the brushes may block 30-100 percent, such as 50-95 percent of the clearance area, whereby aerodynamic losses can be minimized and a higher performance may be ensured. By minimizing the clearance distance between the circumferential edge and the tip end of the blades by use of brushes attached at a distance from the tip end a higher performance of up to 25-30 percent may be achieved.

It should be understood, that the term "brushes extending form the tip end towards the circumferential edge" not only covers brushes extending radially at an angle of 0 degrees where the brushes point directly towards the circumferential edge, but also covers brushes extending at an angle different from zero. As an example the brushes may extend at an angle in the range of +/− 30 degrees, such as in the range of +/− 20 degrees, such as +/− 15 degrees.

The brushes may be formed of bundles of hair which may be arranged in a row. The hair may include fibres of a plastic material, such as different polyamides, e.g. PA6, Nylon, or Kevlar, or from polyester. As an alternative, the hair may include fibres of carbon or various natural fibres, e.g. fibres from plants.

As the brushes at a first end are attached to at least one of the blades at a point of attachment at a distance from the tip end, an overlap is created between the blade and the brushes along a part of the length of the brushes. As the brushes are not attached to the blade in this overlap, the brushes are movable in this overlap and may be bended in case of impact between the brushed and the circumferential edge.

Thus, the brushes overlap the blade from the attachment point to the tip end along the length of the brushes at a pressure side or suction side of the blade. To improve stability of the brushes, the brushes may be attached on the pressure side of the blade.

In the context of the present invention, the 'overlap' of the brushes at the blade should be understood as portion of the blade at the pressure side or suction side, where the brushes extend along a part of the length of the blade. In the overlap at least some of the brushes may touch the blade at least along at part of the length of the brushes.

Additionally, longer brushes may be used whereby an increased flexibility may be obtained. This may further improve the cooling system, as shorter brushes typically are less flexible, i.e. more stiff, and consequently more sensitive to impact with the circumferential edge.

Compared to traditional attachment of brushes at the tip end of a blade, this attachment at a point of attachment at a distance from the tip end can prolong the lifetime of the brushes, since traditionally attached brushes are more easily torn off the tip end and more susceptible to wear.

As the brushes are not attached to the blade in the overlap, a better distribution of the hair may be obtained. This again, may lead to better blocking of the clearance area between the tip end and the circumferential edge.

Since the cooling system is particularly suitable for engines in construction equipment, the brushes may additionally prevent dirt and mud from being deposited on the circumferential edge, and the brushes may reduce noise, particularly aerodynamic noise resulting from air escaping between the tip end and the circumferential edge which result in tip vortices. The reduction of such noise may be up to 15-17 dB.

Furthermore, noise which may result from periodic contact between the blades and the circumferential edge during rotation may be reduced. Also for these purposes, an increased blocking of the clearance area between the tip end of the blades and the circumferential edge is desirable.

To facilitate attachment of the brushes, a groove may be formed in the blade, and the first end of the brushes may be located in the groove. The first end of the brushes may as an example be adhesively attached to the blade in the groove.

In one embodiment, the groove extends parallel to the tip end. It should however be understood, that the distance from the point of attachment to the tip end may be non-uniform along the length of the groove.

The groove may extend from the leading edge of the blade to the trailing edge of the blade, whereby the groove extends along the full depth of the blade at the point of attachment.

However, it should be understood that the groove may extend from the leading edge or from a first point being at a distance from the leading edge to the trailing edge or to a second point being at a distance from the trailing edge.

As an example, the first point may be arranged at a distance in the range of 0.5-30 percent, such as 1-25 percent, such as 2-20 percent of the depth of the blade at the point of attachment. The second point may be arranged at a distance in the range of 0.2-20 percent, such as 0.5-15 percent, such as 1-10 percent of the depth of the blade at the point of attachment.

The first end of the brushes may be attached to the groove by an adhesive. This may be done by providing an adhesive in the groove, and subsequently arranging the first end of the brushes in the groove. In an alternative embodiment, the adhesive is applied to the first end of the brushes which are subsequently arranged in the groove. It should however be understood, that an adhesive may be applied to the first end of the brushes while another or the same type of adhesive is arranged in the groove.

In one embodiment, a part of the adhesive is arranged outside the groove. The adhesive arranged outside the groove may form a substantially wedge-shaped body. This may add to the strength of the joint between the brushes and the blade, and may lower the risk of the brushes being torn of the blade during rotation of the hub with the blades.

To further increase the strength, the adhesive arranged outside the groove may extend along the blade in a direction opposite to the brushes; i.e. toward the root end of the blade. If the wedge-shape body is arranged so that the pointed end of the wedge points toward the root end, the strength may be further increased.

To ensure that the brushes can block at least a part of the clearance area between the tip end and the circumferential edge, a length of the brushes in the radial direction is larger than the distance from the point of attachment to the tip end.

In one embodiment, the length of the brushes is non-uniform whereby blocking of the clearance area between the tip end and the circumferential edge is un-equal along the depth of the blade. It should however be understood that the length of the brushed may in an alternative embodiment be substantially uniform.

The length of the brushes may be in the range of 0.5-10 percent of the length of the blade in the radial direction.

Furthermore, the distance from the point of attachment to the tip end may be in the range of 0.4-9 percent of a length of the blade in the radial direction.

In one embodiment, the brushes may be formed before attaching the brushes to the blade. As an example, the first end of the brushes may be formed as a bead which may be formed by welding of the first end whereby the one end of the hair forming the brushes may melt. To facilitate attachment of the brushes, the bead may be located in the groove, and the brushes may be attached to the blade by bonding the bead to the blade, e.g. by providing an adhesive in the groove.

To facilitate attachment of the brushes, the welding may include infusion of an adhesive between the brushes at the first end, which adhesive may bond the brushes to the blade.

It should however be understood, that the brushes may alternatively be formed by attaching bundles of hair to the blade.

In one embodiment, the brushes may extend substantially parallel to the blade. In an alternative embodiment, the brushes may however be tilted in a tilt direction forming an angle relative to the radial direction. The angle may be in the range of 0-25 degrees, such as in the range of 0-15 degrees. If tilted, the brushes may extend backwards relative to the direction of rotation.

To protect the brushes during operation of the fan, the tip end of the at least one blade may terminate in a trimmed edge, as this may decrease wear of the brushes compared to a blade terminating in a sharp edge where the sharp edge may cut the brushes during operation. The trimmed edge may be a rounded edge, a chamfered edge, or an otherwise worked edge.

To further protect the brushes during operation of the fan, a resilient profile may be attached to the circumferential edge along the edge of the aperture for protection of the brushes during rotation of the hub. This may prolong the lifespan of the brushes. The resilient profile may e.g. comprise a low friction material, e.g. including Polytetrafluoroethylene (PTFE) or vinyl.

As an alternative a second brush may be attached along the edge of the aperture, as this second brush may both add to the sealing of the gab and protect the brushes attached to the blade.

In one embodiment, the tip end may comprise a first portion extending from a leading edge of the blade to a radial step, and a second portion extending from the radial step to a trailing edge of the blade, wherein the distance from the axis to the second portion of the tip edge is smaller than the distance from the axis to the first portion of the tip edge. If the fan is arranged so that at least a part of the second portion is arranged partly in the aperture, a larger clearance distance between the tip end of the blades and the orifice plate may be provided at the second portion, whereas the clearance distance between the tip end of the blades and the orifice plate at the first portion may be smaller.

Is should be understood, that the brushes may be arranged so that an overlap between the brushes and the blade exists both at the first portion and at the second portion.

According to a second aspect, the invention provides an axial fan comprising a hub being adapted for rotation about an axis and carrying a plurality of blades, each blade extending in a radial direction between a root end and a tip end, the root end being joined with the hub, the fan further comprising brushes extending from the tip end towards the circumferential edge, wherein the brushes at a first end are attached to at least one of the blades at a point of attachment at a distance from the tip end, and wherein the brushes overlap the blade from the attachment point to the tip end along the length of the brushes at a pressure side or suction side of the blade.

It should be understood, that a skilled person would readily recognise that any feature described in combination with the first aspect of the invention could also be combined with the second aspect of the invention, and vice versa.

The axial fan according to the second aspect of the invention is very suitable for cooling system according to the first aspect of the invention. The remarks set forth above in relation to the cooling system are therefore equally applicable in relation to the axial fan.

BRIEF DESCRIPTION OF THE DRAWINGS

Embodiments of the invention will now be further described with reference to the drawings, in which.

DETAILED DESCRIPTION OF THE DRAWINGS

It should be understood that the detailed description and specific examples, while indicating embodiments of the invention, are given by way of illustration only, since various changes and modifications within the spirit and scope of the invention will become apparent to those skilled in the art from this detailed description.

Figure 1:
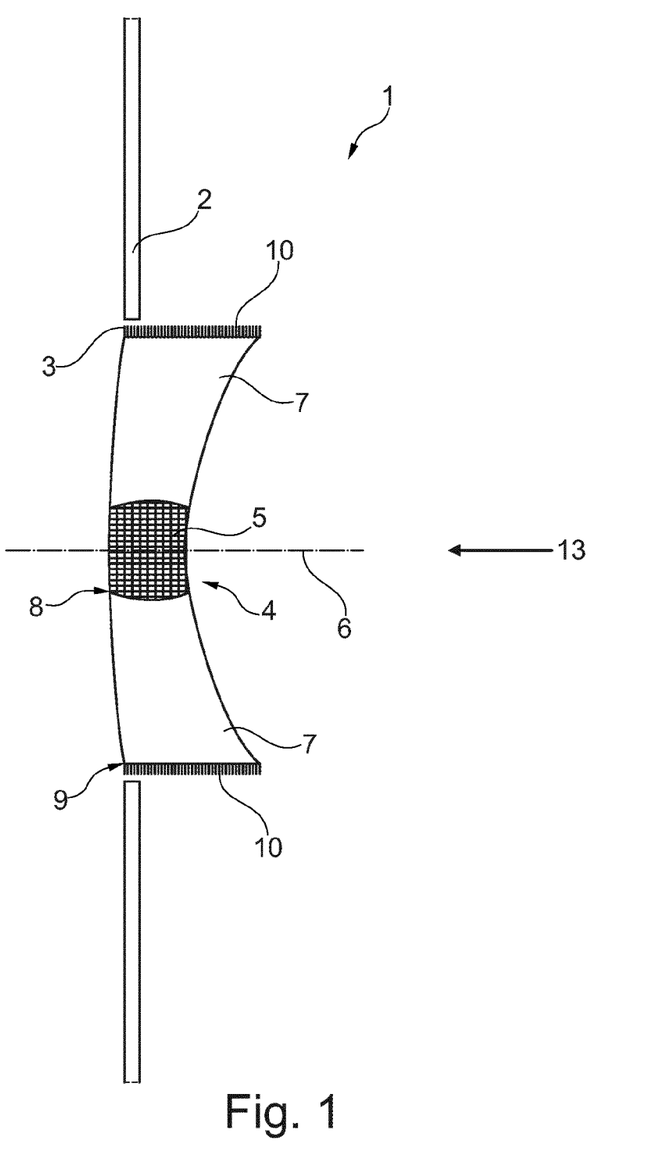
FIG. 1 illustrates a cooling system.

FIG. 1 illustrates a cooling system 1 which comprises a circumferential edge 2 forming an aperture 3 and an axial fan 4 arranged partly within the aperture 3. The axial fan 4 comprises a hub 5 being adapted for rotation about an axis 6 and carrying a plurality of blades 7 of which only two are illustrated.

Each blade extends in a radial direction between a root end 8 and a tip end 9, the root end 8 being joined with the hub 5. The cooling system 1 further comprises brushes 10 extending from the tip end 9 towards the circumferential edge 2. At a first end 11 (see FIG. 3) the brushes 10 are attached to the blades 7 at a point of attachment 12 at a distance d from the tip end 9.

The fan 4 is adapted to move air in a direction parallel with the rotation axis 6 of the fan as indicated by the arrow 13. During operation of the fan 4, air is moved through the aperture 3 of the circumferential edge 2.

Figure 2:
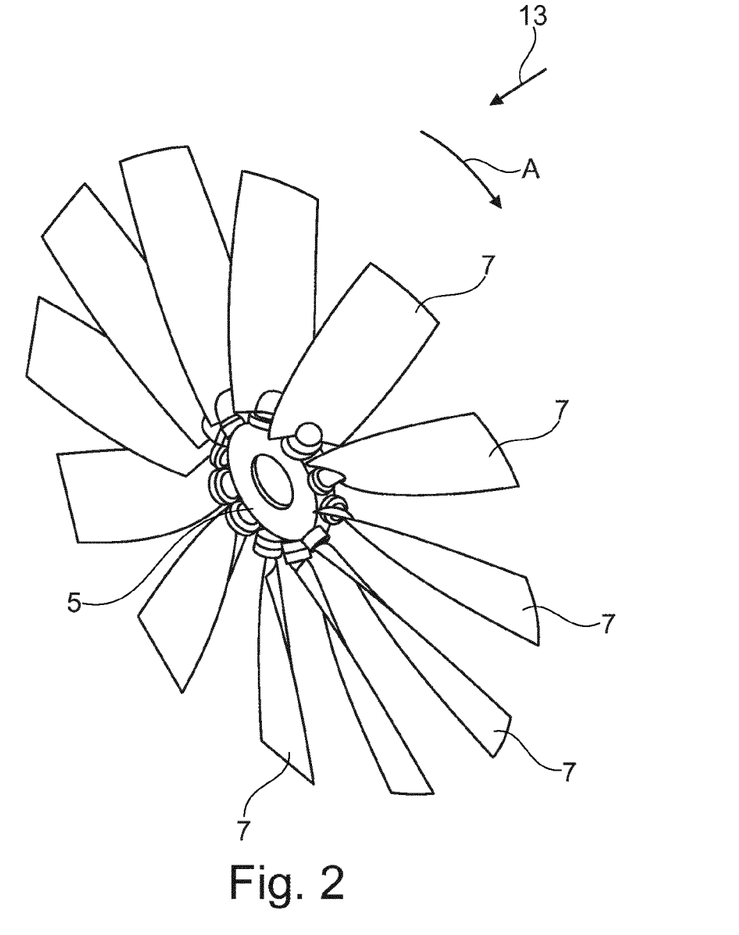
FIG. 2 illustrates a hub with blades.

FIG. 2 illustrates a hub 5 at which twelve blades 7 are attached. The hub 5 with blades 7 are rotated as indicated by the arrow A. The brushes are not shown in FIG. 2.

Figure 3:
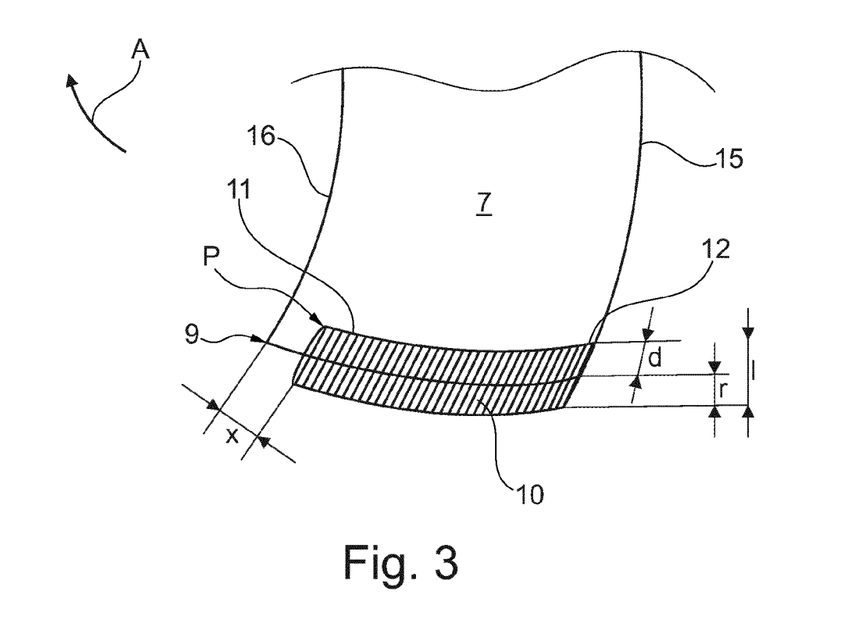
FIG. 3 illustrates a part of a blade with brushes.

FIG. 3 illustrates a part of a blade 7 at which brushes 10 are attached at a point of attachment 12 at a distance d from the tip end 9. The brushes 10 extent beyond the tip end 9, as the length l of the brushes 10 is longer than the distance d, whereby the brushes extend a distance of r from the tip end. In the illustrated embodiment, the distance d is approximately 4 mm, whereas the distance r is approximately 5 mm.

Thus, the brushes 10 overlap the blade 7 from the attachment point 12 to the tip end 9 along a part of the length of the brushes 10. The overlap has a size in the longitudinal direction which corresponds to the distance d. The brushes 10 are attached at the pressure side of the blade 7.

Figure 4:
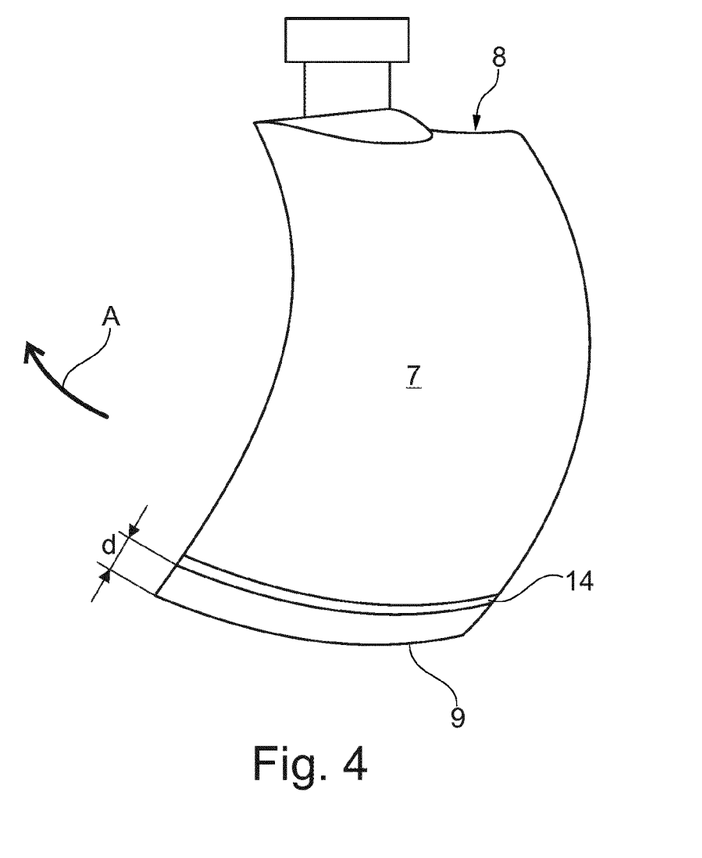
FIG. 4 illustrates a blade with a groove.

As illustrated in FIG. 4, a groove 14 is formed in the blade 7 at a distance d from the tip end 9. To facilitate attachment of the brushes (not shown), a first end (i.e. a brush root end) of the brushes can be located in the groove 14. The first end of the brushes may be adhesively attached to the blade 7 in the groove 14. When brushes are attached to the blade 7, an overlap between the brushes and the blade 7 will exist at the part of the blade between the groove 14 and the tip end 9.

As illustrated in FIG. 3, the groove 14 extend from the trailing edge 15 of the blade to a first point P being at a distance x from the leading edge 16. The groove itself is not visible in FIG. 3, as the first end 11 of the brushes 10 is located in the groove.

Figure 5:
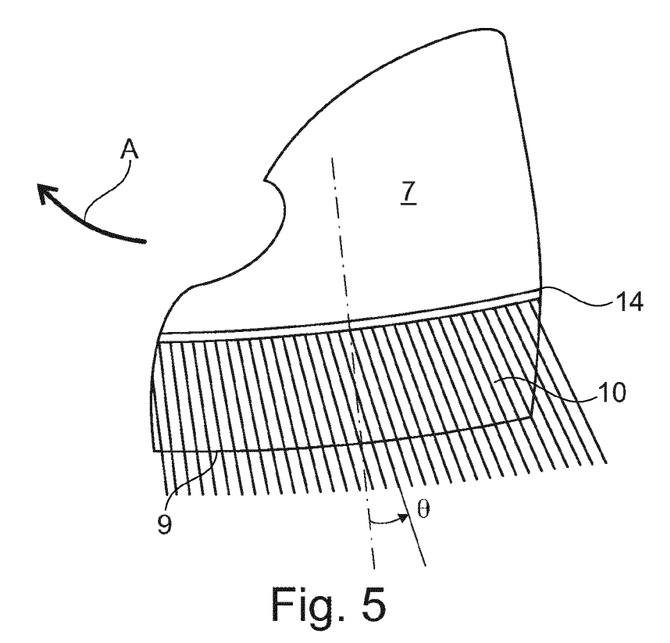
FIG. 5 illustrates a part of a blade with brushes being tilted.

FIG. 5 illustrates a part of a blade 7 where the brushes 10 are tilted at an angle θ so that they extend backwards relative to the direction of rotation.

Figure 6:
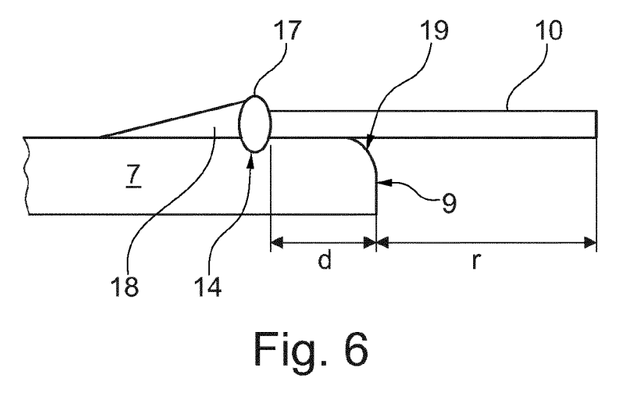
FIG. 6 illustrates a part of a blade with brushes.

FIG. 6 illustrates a detailed view of brushes 10 attached to a blade 7 in a groove 14 at a distance d from the tip end 9. The first end of the brushes 10 is formed as a bead 17 by welding of the first end. The first end of the brushes 10, i.e. the bead 17 is attached to the groove 14 by an adhesive. A part of the adhesive 18 is arranged outside the groove, and forms a substantially wedge-shaped body, as this may add to the strength of the joint between the brushes 10 and the blade 7.

As illustrated in FIG. 6, the adhesive 18 arranged outside the groove 14 extends along the blade 7 in a direction opposite to the extension of the brushes 10; i.e. toward the root end of the blade (not shown in this figure). The wedge-shape body 18 is arranged so that the pointed end of the wedge points toward the root end.

To protect the brushes 10 during operation of the fan, the tip end 9 of the blade 7 terminates in a trimmed edge 19, as this may decrease wear of the brushes. In the illustrated embodiment, the trimmed edge 19 is a rounded edge.

The invention claimed is:

1. A cooling system comprising a circumferential edge forming an aperture and an axial fan arranged at least partly within the aperture, the axial fan comprising a hub being adapted for rotation about an axis and carrying a plurality of blades, each blade extending in a radial direction between a root end and a tip end, the root end being joined with the hub, the system further comprising brushes extending from the tip end towards the circumferential edge, wherein the brushes at a first end are attached to at least one of the blades at a point of attachment at a distance from the tip end, and wherein the brushes overlap the blade from the attachment point to the tip end along the length of the brushes at a pressure side or suction side of the blade, wherein the brushes are movable in the overlap.

2. The cooling system according to claim 1, wherein a groove is formed in the at least one blade, and wherein the first end of the brushes is located in the groove.

3. The cooling system according to claim 2, wherein the groove extends in parallel to the tip end.

4. The cooling system according to claim 2, wherein the groove extends from a leading edge of the blade to a trailing edge of the blade.

5. The cooling system according to claim 2, wherein the first end of the brushes is attached to the groove by an adhesive.

6. The cooling system according to claim 5, wherein a part of the adhesive is arranged outside the groove.

7. The cooling system according to claim 6, wherein the adhesive arranged outside the groove forms a substantially wedge-shaped body.

8. The cooling system according to claim 6, wherein the adhesive extends along the blade in a direction opposite to the brushes.

9. The cooling system according to claim 1, wherein a length of the brushes in the radial direction is larger than the distance from the point of attachment to the tip end.

10. The cooling system according to claim 9, wherein the length of the brushes is non-uniform.

11. The cooling system according to claim 9, wherein the length of the brushes is in the range of 0.5-10 percent of a length of the blade in the radial direction.

12. The cooling system according to claim 1, wherein the distance from the point of attachment to the tip end is in the range of 0.4-9 percent of a length of the blade in the radial direction.

13. The cooling system according to claim 1, wherein the first end of the brushes is formed as a bead which is formed by welding of the first end.

14. The cooling system according to claim 13, wherein the welding includes infusion of an adhesive between the brushes.

15. The cooling system according to claim 14, wherein the adhesive bonds the brushes to the blade.

16. The cooling system according to claim 1, wherein the brushes extend parallel to the blade.

17. The cooling system according to claim 1, wherein the tip end terminates in a trimmed edge.

18. The cooling system according to claim 1, wherein a resilient profile is attached to the circumferential edge along the aperture for protection of the brushes during rotation of the hub.

19. An axial fan comprising a hub being adapted for rotation about an axis and carrying a plurality of blades, each blade extending in a radial direction between a root end and a tip end, the root end being joined with the hub, the fan further comprising brushes extending from the tip end towards a circumferential edge, wherein the brushes at a first end are attached to at least one of the blades at a point of attachment at a distance from the tip end, and wherein the brushes overlap the blade from the attachment point to the tip end along the length of the brushes at a pressure side or suction side of the blade, wherein the brushes are movable in the overlap.

* * * * *